United States Patent Office 3,438,863
Patented Apr. 15, 1969

3,438,863
FERMENTATION PROCESS FOR PRODUCING CITRIC ACID
Mario Alexander Batti, Elkhart, Ind., assignor to Miles Laboratories, Inc., Elkhart, Ind., a corporation of Indiana
No Drawing. Filed July 25, 1966, Ser. No. 567,395
Int. Cl. C12c
U.S. Cl. 195—36                                  5 Claims

ABSTRACT OF THE DISCLOSURE

Citric acid fermentation of carbohydrates (especially where iron is a contaminant) is improved by adding quaternary ammonium compounds or amine oxides to the fermentation medium.

---

This invention relates to a process for the fermentation production of citric acid. More particularly, it relates to a process of improving citric acid yields by adding quaternary ammonium compounds or amine oxide compounds to the fermentation medium.

It is known in the art that citric acid can be produced in commercial quantities by the fermentation of carbohydrate materials using various strains of citric acid-producing fungi. Certain strains of *Aspergillus niger* have proved to be particularly useful for this purpose. In addition, various strains of other species of fungi, such as *Aspergillus clavatus*, *Aspergillus wentii*, *Aspergillus luchuensis*, *Penicillium citrinum*, *Penicillium luteum*, and the like, have been used with varying degrees of success.

One form of fermentation process employed in the art for citric acid production involves a submerged fermentation wherein the carbohydrate substrate, the citric acid-producing fungal strain and nutrients necessary for fungal metabolism are contained within a vertical tank and air is passed through the tank contents. This air stream provides the oxygen-containing atmosphere necessary for fungal metabolism and also provides a means for agitating and mixing the fermentor tank contents.

It is also known in the art that contaminating materials can interfere with the citric acid-producing fermentation and reduce the overall yield of citric acid as well as cause the production of undesirable by-products. An excess amount of iron is exemplary of such contaminants. The harmful effects of the contaminants have been overcome somewhat in the prior art through use of additives, such as copper and organic materials, such as cresylic acid, xylenol, cresol and the like. However, these prior art additives still leave something to be desired, especially when excess iron contamination, for example, is present in the fermentation medium.

It is an object of the present invention to provide a process for improving the yield of citric acid.

It is a further object to provide a process for improving the yield of citric acid in the presence of undesirable contamination.

In accordance with the present invention, a process is provided for producing citric acid which comprises fermenting a carbohydrate medium with a strain of a citric acid-producing fungus and adding to said medium a compound selected from the class consisting of quaternary ammonium compounds and amine oxides to promote the formation of citric acid. The added compound should be added to the medium in an amount from about 2 to about 50 parts per million. Preferably, the added compound is added to the medium in an amount from about 5 to about 20 parts per million.

Exemplary quaternary ammonium compounds that can be used in the present invention are: diisobutylphenoxyethoxyethyldimethylbenzyl ammonium chloride; diisobutylcresoxyethoxyethyldimethylbenzyl ammonium chloride; mixtures of n-alkyldimethylbenzyl ammonium chlorides wherein the n-alkyl radicals have 12, 14 or 16 carbon atoms; stearyldimethylbenzyl ammonium chloride; alkyldimethylethylbenzyl ammonium chlorides; alkyldimethyl-3,4-dichlorobenzyl ammonium chlorides; methyldodecylbenzyltrimethyl ammonium chloride; tallowdimethylbenzyl ammonium chloride; dicocodimethyl ammonium chloride; disoyadimethyl ammonium chloride; distearyldimethyl ammonium chloride; n-alkyltrimethyl ammonium chlorides wherein the alkyl radicals may be dodecyl, tetradecyl, hexadecyl or octadecyl; methyldodecylxylene bis (trimethyl ammonium chloride); cetyltrimethyl ammonium bromide; tallowtrimethyl ammonium chloride; phenyltrimethyl ammonium chloride; alkyldimethylnaphthyl ammonium chlorides; alkylmethylisoquinolinium chlorides; laurylisoquinolinium bromide; cetylpyridinium chloride; cetyldimethylethyl ammonium chloride; propoxylated ammonium methyl sulfates; ditallowdimethyl ammonium methyl sulfate; and the like. In the above compounds, unless otherwise defined, the expression "alkyl" refers to any straight or branched chain monovalent saturated hydrocarbon radical containing one or more carbon atoms. Preferably, the expression "alkyl" refers to a straight chain monovalent hydrocarbon radical containing from about 12 to about 20 carbon atoms.

Exemplary amine oxides that can be used in the present invention are: bis(2-hydroxyethyl)tallowamine oxide; dimethyl hydrogenated tallowamine oxide; cetyldimethyl amine oxide; stearyldimethyl amine oxide; myristyldimethyl amine oxide; lauryldimethyl amine oxide and the like.

The carbohydrate materials useful as the fermentation substrate for citric acid production according to the present invention can be any of the sugar-containing materials known to the art. Such materials are exemplified by sugar syrups obtained from natural sources, such as cane syrup, and sugar-containing materials obtained by hydrolysis of starch, such as corn starch. The hydrolysis of starch to form glucose can be catalyzed by the well known use of hydrochloric acid or enzymes, such as amyloglucosidase.

The general process details for carrying out the citric acid fermentation are described, for example in U.S. Patent Nos. 2,476,159 of L. B. Schweiger et al.; 2,492,667 of R. L. Snell et al.; 2,492,673 of J. C. Woodward et al.; 2,916,420 of L. B. Schweiger; 2,970,084 of L. B. Schweiger and 3,083,144 of M. W. Shepard. Such general process conditions are followed in carrying out the present invention which relates principally to adding quaternary ammonium compounds or amine oxide compounds to the fermentation medium in order to improve the citric acid yields, especially in the presence of iron contamination.

The invention will be further described in the following examples.

EXAMPLE 1

A 78 liter quantity of glucose solution was decationized by well known procedures and then nutrients were added to the decationized liquid in the amounts of 0.10 weight percent $MgSO_4 \cdot 7H_2O$, 25 p.p.m. (parts per million by weight) $Ca^{++}$ ions as $CaCl_2 \cdot 2H_2O$ and sufficient $NH_4OH$ to adjust the pH to 2.92. This mixture was then autoclaved for 15 minutes at 250°–255° F. (121°–124° C.) and 16–18 p.s.i.g. to sterilize it. This sterilized fermentation substrate and nutrient mixture was then cooled to room temperature (about 20°–25° C.) To this sterilized fermentation substrate were then added sterilized quantities of 0.02 weight percent $KH_2PO_4$, 0.05 p.p.m. $Fe^{+++}$ as ferric ammonium citrate and 50 p.p.m. of a polyoxyalkylene derivative of sorbitan monooleate surface active agent. A 4 liter quantity was charged to a vertical aerated fermentor. This fermentor consisted of a vertical glass pipe 4 inches O.D. and 48 inches long. The ends of the pipe were sealed with stainless steel end plates provided with air inlet and outlet passages. A glass sparger was attached to the air inlet line near the bottom of the glass pipe to provide air distribution throughout the fermentor contents. To the 4 liter fermentor contents containing 777 grams of glucose were added 0.15 p.p.m. $Zn^{++}$ ions as $ZnSO_4 \cdot 7H_2O$. A second fermentor was charged with 4 liters of the same fermentation substrate and nutrient mixture to which was added the above amount of zinc salt and 10 p.p.m. of a quaternary ammonium compound in the form of diisobutylphenoxyethoxyethyldimethylbenzyl ammonium chloride. A third fermentor was charged with 4 liters of the same fermentation substrate and nutrient mixture to which was added the same amount of zinc salt and 5 p.p.m. of a quaternary ammonium compound in the form of a mixture of n-alkyl dimethylbenzyl ammonium chlorides wherein the n-alkyl radical contains 12, 14 or 16 carbon atoms. Aeration to all fermentors was started at 6 liters of air per minute. The fermentor contents were each then inoculated with an aqueous suspension of *Aspergillus niger* spores. The fermentors were then heated to 30°–33° C. and the aeration continued at the above rate for 24 hours. The aeration was then increased to 7–8 liters per minute. Supplemental nitrogen nutrient was added to each fermentor in an amount of 5 ml. of conc. $NH_4OH$ after 5 days and 16 hours. The fermentations were continued for a total of 10 days and 16 hours. The first fermentor had a citric acid yield of 49.4 percent based on the sugar content of the medium. The second fermentor had a citric acid yield of 92 percent and the third fermentor had a citric acid yield of 89.8 percent. These data indicate that the presence of a quaternary ammonium compound in the fermentation medium increases the yield of citric acid.

EXAMPLE 2

A 90 liter quantity of glucose solution was decationized by well known procedures and then nutrients were added to the decationized liquid in the amounts of 25 p.p.m. $Ca^{++}$ as $CaCl_2 \cdot 2H_2O$, 0.02 weight percent $KH_2PO_4$, 0.1 weight percent $MgSO_4 \cdot 7H_2O$ and sufficient $NH_4OH$ to adjust the pH to 3.08. This mixture was then sterilized in a manner similar to that described in Example 1 above. To this sterilized fermentation substrate were then added sterilized quantities of 0.05 p.p.m. $Fe^{+++}$ as ferric ammonium citrate and 120 p.p.m. of a polyoxyalkylene derivative of sorbitan monooleate surface active agent. A 4 liter portion of this medium was charged to a fermentor of the type described in Example 1 above. To the 4 liter fermentor contents containing 822 grams of glucose were added 0.15 p.p.m. $Zn^{++}$ ions as $ZnSO_4 \cdot 7H_2O$. A second fermentor was charged with 4 liters of the same fermentation substrate and nutrient mixture to which was added the same amount of zinc salt and 15 p.p.m. of a quaternary ammonium compound in the form of diisobutylcresoxyethoxyethyldimethylbenzyl ammonium chloride. Aeration to both fermentors was started at 6 liters of air per minute. The fermentor contents were each then inoculated with an aqueous suspension of *Aspergillus niger* spores. The fermentors were then heated to 30–33° C., and the aeration continued at the above rate for 24 hours. The aeration was then increased to 7–8 liters per minute. The fermentations were continued for 10 days and 17 hours for the first fermentor and 8 days and 10 hours for the second fermentor. The first fermentor had a citric acid yield of 61.2 percent based on the sugar content of the medium while the second fermentor had a citric acid yield of 92.1 percent. These data indicate that the presence of a quaternary ammonium compound in the fermentation medium increases the yield of citric acid.

EXAMPLE 3

A 100 liter quantity of glucose solution was decationized by well-known procedures and then nutrients were added to the decationized liquid in the amounts of 0.10 weight percent $MgSO_4 \cdot 7H_2O$, 0.02 weight percent $KH_2PO_4$, 25 p.p.m. $Ca^{++}$ ions as $CaCl_2 \cdot 2H_2O$ and sufficient $NH_4OH$ to adjust the pH to 2.90. This mixture was then autoclaved for 25 minutes at 250° F. (121° C.) and 16 p.s.i.g. to sterilize it. This sterilized fermentation substrate and nutrient mixture was then cooled to room temperature. To this sterilized medium were then added sterilized quantities of 0.15 p.p.m. $Zn^{++}$ as $ZnSO_4 \cdot 7H_2O$ and 100–125 p.p.m. of a surface active soybean oil commercial anti-foam agent. A 4 liter portion of this medium was charged to a first fermentor of the type described in Example 1 above. To the 4 liter fermentor contents containing 809 grams of glucose were added 10 p.p.m. of a quaternary ammonium compound in the form of diisobutylphenoxyethoxyethyldimethylbenzyl ammonium chloride. A second fermentor was charged with 4 liters of the same medium to which were added 10 p.p.m. of the same quaternary ammoninum compound and 0.1 p.p.m. $Fe^{+++}$ ions as ferric ammonium citrate. A third fermentor was charged with 4 liters of the same medium to which were added 10 p.p.m. of the same quaternary ammonium compound and 0.2 p.p.m. $Fe^{+++}$ ions. A fourth fermentor was charged with 4 liters of the same medium to which were added 10 p.p.m. of the same quaternary ammonium compound and 0.3 p.p.m. $Fe^{+++}$ ions. Aeration to all fermentors was started at 6 liters of air per minute. The fermentor contents were each then inoculated with an aqueous suspension of *Aspergillus niger* spores. The fermentors were then heated to 30–33° C. and the aeration continued at the above rate for 24 hours. The aeration was then increased to 7–8 liters per minute. Supplemental nitrogen nutrient was added to each fermentor in an amount of 3 ml. of conc. $NH_4OH$ after 5 days and 17 hours. The fermentations were continued for 8 days and 16 hours for the first and second fermentors, 9 days and 15 hours for the third fermentor and 10 days and 15 hours for the fourth fermentor. The first fermentor had a citric acid yield of 85.8 percent based on the sugar content of the medium. The citric acid yields of the second, third and fourth fermentors were, respectively, 88.8 percent, 86.0 percent and 74.6 percent.

It is well known that iron will reduce the citric acid yield. Copper, in amounts of about 0.15 p.p.m., is added, according to prior art technology, to overcome the inhibitory action of iron. However, when iron is present in the above medium in amounts of 0.3 p.p.m. and copper is present in amounts of 0.15 p.p.m., the citric acid yield is only 15.8 percent. The use of quaternary ammonium compounds, in accordance with the present invention, has a distinct advantage over the prior art when excess iron is present. Such a condition could occur if there is corrosion of the metal fermentors employed in commercial citric acid production.

EXAMPLE 4

To a portion of the sterilized medium of Example 3 above were added 0.05 p.p.m. $Fe^{+++}$ ions as ferric ammonium citrate, 0.15 p.p.m. $Zn^{++}$ ions as $ZnSO_4 \cdot 7H_2O$ and 10–20 p.p.m. of a surface active soybean oil commerical antifoam agent. Three liter quantities of this medium each containing 606 grams of glucose were then charged to each of four mermentors of the type described in Example 1 above. A different quaternary ammonium compound was added in an amount of 5 p.p.m. to each of the fermentors. The separate quaternary ammonium compounds were: cetyl pyridinium chloride, alkyl methyl isoquinolinium chloride, stearyldimethylbenzyl ammonium chloride, and a mixture of alkyldimethylbenzyl ammonoium chloride and alkyldimethylethylbenzyl chloride. Aeration to all fermentors was started at 6–7 liters of air per minute. The fermentor contents were each then inoculated with an aqueous suspension of *Aspergillus niger* spores. The fermentors were then heated to 30–33° C., and the aeration was continued at the above rate for 24 hours. The aeration was then increased to 7–8 liters per minute. Supplemental nitrogen nutrient was added to each fermentor in an amount of 5 ml. of conc. $NH_4OH$ after 4 days and 15 hours. The fermentations were continued and terminated in the first fermentor after 13 days and 16 hours and in the other fermentors after 8 days and 16 hours. The citric acid yields, based on the sugar content of the medium, for the separate fermentors were, respectively, 65.3 percent, 89.9 percent, 88.2 percent and 90.7 percent. A control fermentation using this medium but without any quaternary ammonium compound had a citric acid yield of only 50.9 percent after 8 days and 16 hours.

EXAMPLE 5

To a portion of the sterilized medium of Example 3 above were added 0.1 p.p.m. $Fe^{+++}$ as ferric ammonium citrate, 0.15 p.p.m. $Zn^{++}$ as $ZnSO_4 \cdot 7H_2O$ and 125 p.p.m. of a surface active soybean oil commercial antifoam agent. Three liter quantities of this medium each containing 606 grams of glucose were then charged to each of two fermentors of the type described in Example 1 above. A different quaternary ammonium compound was added in an amount of 20 p.p.m. to each of the fermentors. The separate quaternary ammonium compounds were: dicocodimethyl ammonium chloride and propoxylated ammonium methyl sulfate. Aeration to both fermentors was started at 6–7 liters of air per minute. The fermentor contents were each then inoculated with an aqueous suspension of *Aspergillus niger* spores. The fermentors were then heated to 30–33° C. and the aeration was continued at the above rate for 24 hours. The aeration was then increased to 7–8 liters per minute. The fermentations were continued for 8 days and 19 hours. The citric acid yield in the first fermentor was 32 percent and in the second fermentor 57.2 percent. The citric acid yield in a comparable medium not containing any quaternary ammonium compound was only 17 percent.

EXAMPLE 6

An 86 liter quantity of glucose solution was decationized by well-known procedures and then nutrients were added to the decationized liquid in the amounts of 0.10 weight percent $MgSO_4 \cdot 7H_2O$, 0.02 weight percent $KH_2PO_4$, 25 p.p.m. $Ca^{++}$ as $CaCl_2 \cdot 2H_2O$, 0.1 p.p.m. $Cu^{++}$ as $CuSO_4 \cdot 5H_2O$, 0.1 p.p.m. $Zn^{++}$ as $ZnSO_4 \cdot 7H_2O$, 0.3 p.p.m. $Fe^{+++}$ as ferric ammonium citrate and sufficient $NH_4OH$ to adjust the pH to 3.1. This mixture was then autoclaved for 30 minutes at 250–255° F. (121–124° C.) and 16–18 p.s.i.g. to sterilize it. This sterilized fermentation medium was then cooled to room temperature. Three liter quantities of this medium each containing 745 grams of glucose were then charged to each of two fermentors of the type described in Example 1 above.

To the first fermentor were added 5 p.p.m. of bis(2-hydroxyethyl) tallowamine oxide. To the second fermentor were added 5 p.p.m. of dimethyl hydrogenated tallowamine oxide. Aeration to both fermentors was started at 6 liters of air per minute. Supplemental nitrogen nutrient was added to each fermentor in amounts of 2 ml. of conc. $NH_4OH$ after 4 days and 18 hours and 3 ml. of conc. $NH_4OH$ after 6 days and 17 hours. The fermentations were continued for 11 days and 18 hours. The citric acid yield in the first fermentor was 82.6 percent and in the second fermentor 83.3 percent. The citric acid yield in a comparable medium not containing the amine oxide was only 43.1 percent.

In summary, this invention relates to a process improvement for increasing the citric acid-producing activity of a fermentation medium by adding a quaternary ammonium compound or an amine oxide to the medium.

What is claimed is:

1. In a process for producing citric acid which comprises fermenting a carbohydrate medium with a strain of a citric acid-producing fungus, the improvement which comprises adding to said medium a compound selected from the class consisting of quaternary ammonium compounds and amine oxides to promote the formation of citric acid.

2. A process according to claim 1 wherein the added compound is added to the medium in an amount from about 2 to about 50 parts per million.

3. A process according to claim 1 wherein the added compound is added to the medium in an amount from about 5 to about 20 parts per million.

4. A process according to claim 1 wherein the added quaternary ammonium compound is selected from the class consisting of diisobutylphenoxyethoxyethyldimethylbenzyl ammonium chloride, a mixture of n-alkyldimethylbenzyl ammonium chlorides wherein the n-alkyl radical contains 12, 14 or 16 carbon atoms, diisobutylcresoxyethyoxyethyldimethylbenzyl ammonium chloride, cetyl pyridinium chloride, alkylmethylisoquinolinium chloride, stearyldimethylbenzyl ammonium chloride, alkyldimethylbenzyl ammonium chloride, alkyldimethylethylbenzyl ammonium chloride, dicocodimethyl ammonium chloride and propoxylated ammonium ethyl sulfate.

5. A process according to claim 1 wherein the added amine oxide compound is selected from the class consisting of bis(2 - hydroxyethyl) - tallowamine oxide and dimethylhydrogenated tallowamine oxide.

References Cited

UNITED STATES PATENTS 3,189,527    6/1965    Lockwood et al. _____ 195—36

LIONEL M. SHAPIRO, *Primary Examiner.*